United States Patent [19]

Straayer et al.

[11] Patent Number: 4,680,577
[45] Date of Patent: Jul. 14, 1987

[54] MULTIPURPOSE CURSOR CONTROL KEYSWITCH

[75] Inventors: David H. Straayer; Patrick J. Franz, both of Colton; Eugene F. Lynch, Portland, all of Oreg.

[73] Assignee: Tektronix, Inc., Beaverton, Oreg.

[21] Appl. No.: 854,687

[22] Filed: Apr. 18, 1986

Related U.S. Application Data

[63] Continuation of Ser. No. 555,792, Nov. 28, 1983, abandoned.

[51] Int. Cl.⁴ .......................................... H01H 25/00
[52] U.S. Cl. .................................. 340/711; 340/709; 340/706; 400/485
[58] Field of Search .................. 340/709, 706, 365 A, 340/365 R, 711; 178/18; 74/471 XY; 73/862.05; 200/5 A, 6 A, 52 R; 400/485, 489; 310/311, 314, 330, 348

[56] References Cited

U.S. PATENT DOCUMENTS

| | | | |
|---|---|---|---|
| 3,561,280 | 2/1971 | MacPhee | 74/471 XY |
| 3,633,724 | 1/1972 | Samuel | 400/485 |
| 3,715,933 | 2/1973 | Robinson | 200/6 A |
| 3,772,597 | 11/1973 | Stover | 340/365 S |
| 3,824,354 | 7/1974 | Anderson | 340/365 R |
| 3,832,895 | 9/1974 | Strandh | 74/471 XY |
| 3,965,315 | 6/1976 | Wuenn | 200/6 A |
| 4,029,915 | 6/1977 | Ojima | 200/6 A |
| 4,046,005 | 9/1977 | Goroski | 73/862.05 |
| 4,078,226 | 3/1978 | EerNisse | 310/311 |
| 4,201,489 | 5/1980 | Zapp | 400/489 |
| 4,246,452 | 1/1981 | Chandler | 340/365 R |
| 4,313,113 | 1/1982 | Thornburg | 340/709 |
| 4,348,634 | 9/1982 | David | 74/471 XY |
| 4,382,166 | 5/1983 | Kim | 340/709 |
| 4,408,103 | 10/1983 | Smith, III | 200/6 A |
| 4,439,648 | 3/1984 | Reiner | 200/6 A |
| 4,469,330 | 9/1984 | Asher | 200/6 A |
| 4,536,746 | 8/1985 | Gobeli | 340/365 A |

FOREIGN PATENT DOCUMENTS

81/02272 8/1981 PCT Int'l Appl. ................. 400/489

OTHER PUBLICATIONS

IBM Technical Disclosure Bulletin: "Single Key Cursor Control", R. W. Truelson, vol. 26, No. 7B, Dec. 1983-pp. 3746, 3747.
IBM Technical Disclosure Bulletin: "Smart Key", vol. 28, No. 5, Oct. 1985, pp. 1859, 1860.

Primary Examiner—John W. Caldwell, Sr.
Assistant Examiner—Ruffin B. Cordell
Attorney, Agent, or Firm—Allston L. Jones; Robert S. Hulse

[57] ABSTRACT

A multipurpose keyswitch for controlling cursor movement on a CRT display and for character entry includes a key cap that moves laterally to provide cursor control and that moves vertically for character entry. Sensors are coupled to the key cap for sensing the lateral movement of the key cap. Forward and backward movement of the key cap selects upward and downward movement of the cursor on the CRT display. Left and right movement of the key cap selects left and right movement of the cursor. Vertical movement of the key cap selects the entry of a character. The multipurpose keyswitch is advantageously positioned as one of the home keys of the keyboard.

11 Claims, 4 Drawing Figures

MULTIPURPOSE CURSOR CONTROL KEYSWITCH

This is a continuation of application Ser. No. 555,792 filed 11/28/83 and now abandoned.

BACKGROUND OF THE INVENTION

1. Field of the Invention

This invention relates generally to switches for use with computer keyboards, and relates more particularly to a multipurpose keyswitch for controlling cursor movement on a CRT display.

2. Description of the Prior Art

A computer operator typically interacts with a computer through an input device such as a keyboard and an output device such as a cathode ray tube (CRT) display. The operator often must position a cursor on the CRT display via command inputs entered through the keyboard. Since cursor positioning may be required at any location on the CRT, means for both vertical and horizontal movement of the cursor must be provided.

One prior approach to cursor positioning used special function keys that were used solely for controlling cursor movement. Four of such keys were required to provide up and down cursor movement in the vertical direction and left and right cursor movement in the horizontal direction. One disadvantage to this approach was that the operator had to move his fingers from the home position in order to use the special function keys. Another disadvantage was that the keyboards had to be larger in size to accomodate four additional keys.

Another prior approach to cursor positioning was to use four of the existing alphanumeric keys as cursor control keys to provide the four directions of cursor movement. To distinguish cursor movement operation of a cursor control key from its normal character entry operation, an additional key, such as the CONTROL key, had to be depressed in combination with the cursor control key. While this approach overcame some of the disadvantages of the special function keys, it has been found that operators were slow to learn this approach due to confusion as to which cursor control key provided which cursor movement.

Still another prior approach to cursor positioning was to use a separate graphic interaction device, such as a mouse, data tablet, or joystick. One disadvantage to this approach was that additional keyboard space was required for mounting a joystick, and additional desk space was required for peripheral devices such as a data tablet or a mouse. In addition, the operator had to move his hand from the keyboard to the device and had to use major muscle movement to operate the device.

SUMMARY OF THE INVENTION

In accordance with the illustrated preferred embodiment, the present invention provides a multipurpose keyswitch for controlling cursor movement on a CRT display. The keyswitch is multipurpose in that the keyswitch is operable for character entry as well as cursor control. The keyswitch according to the present invention adds the capability of sensing lateral movement for cursor control in addition to the standard keyswitch capability of sensing vertical movement for character entry.

The multipurpose keyswitch of the present invention includes a key cap, a reference structure, and sensors. The reference structure is that portion of a standard keyswitch that moves vertically during character entry. In a standard keyswitch, the key cap and the reference structure would be fixed together for vertical movement as a unit. In the multipurpose keyswitch of the present invention, however, the key cap can, in addition, move laterally with respect to the reference structure to provide cursor control. Sensors are coupled to the key cap for sensing the movement of the key cap with respect to the reference structure. Forward and backward movement of the key cap in the lateral plane corresponds to upward and downward movement of the cursor on the CRT display. Left and right movement of the key cap in the lateral plane corresponds to left and right movement of the cursor. Vertical movement of the key cap and the reference structure corresponds to the entry of a character.

A first embodiment of the multipurpose keyswitch provides a pivotable mounting that couples the key cap to the reference structure and that permits the key cap to move in a lateral plane. Sensors, such as strain gauges, are coupled between the key cap and the reference structure to sense the lateral position of the key cap. One or more sensors are disposed to sense the forward and backward movement of the key cap, and one or more additional sensors are disposed to sense the left and right movement of the key cap.

A second embodiment of the multipurpose keyswitch provides a mounting shaft that is fixed to the key cap at its upper end and is fixed to the reference structure at its lower end. The mounting shafts is sufficiently flexible in bending to permit the key cap to move in the lateral plane. Sensors, such as strain gauges, are affixed to the shaft and are responsive to the bending thereof. One or more sensors sense the forward and backward movement of the key cap, and one or more additional sensors sense the left and right movement of the key cap.

Output signals of the sensors are analog indications of the magnitude and direction of the lateral force on the key cap. The central processing unit of the computer analyzes digital equivalents of the sensor signals to position the cursor on the CRT display.

Since the multipurpose keyswitch is operable for character entry as well as for cursor control, it may be positioned as one of the home keys. Such positioning is advantageous because it permits cursor control without the need for the operator to move his fingers from the home position. Cursor control with the multipurpose keyswitch is easy to learn since the movement of the cursor follows directly from the movement of the key cap. Also, cursor control is more accurate and less time consuming than certain prior art apparatus because fine motor muscles are used to move the key cap. Accordingly, the multipurpose keyswitch of the present invention provides an apparatus for cursor positioning that is easy to use, requires no additional keyboard or desk space, uses fine motor control instead of major muscle movement in its operation, and is accessible from the home position of the keyboard.

DETAILED DESCRIPTION OF THE PREFERRED EMBODIMENTS

Figures 1, 2:
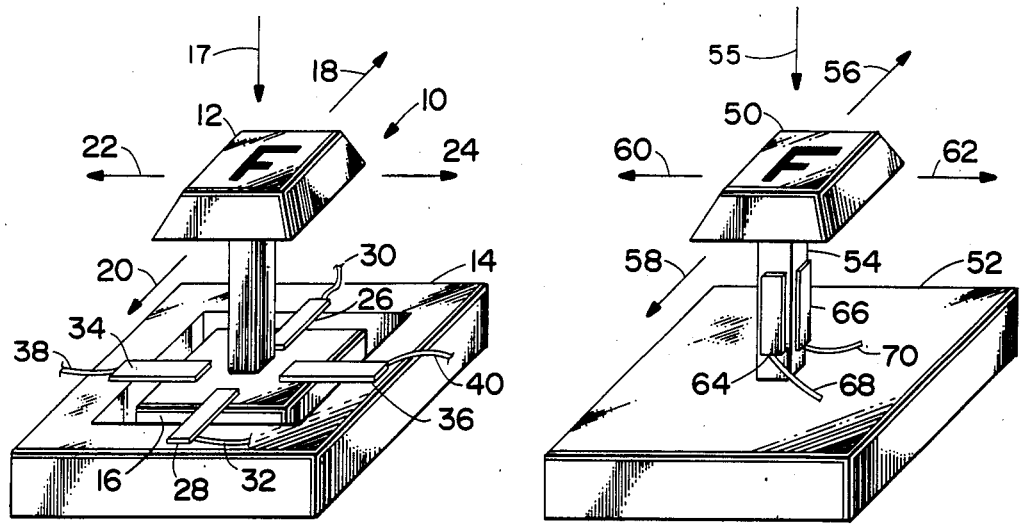
FIG. 1 is a perspective view of a first embodiment of a multipurpose cursor control keyswitch according to the present invention.
FIG. 2 is a perspective view of a second embodiment of a multipurpose cursor control keyswitch according to the present invention.

Turning to FIG. 1, a first embodiment of a multipurpose keyswitch 10 is illustrated. The keyswitch includes a key cap 12 and a reference structure 14 that operate as a standard keyswitch for character entry by vertically depressing key cap 12 along arrow 17. The key cap has a lower portion 16 that is pivotably coupled to the reference structure. This permits the top of the key cap to move in a lateral plane defined by lateral directions 18, 20, 22, and 24. Forward movement along direction 18 selects upward cursor movement, while backward movement along direction 20 selects downward cursor movement. Likewise, movement to the left along direction 22 selects cursor movement to the left, and movement to the right along direction 24 selects cursor movement to the right. Movement of the key cap and reference structure vertically downward selects character entry, which in the illustrated keyswitch is the entry of the letter "F". Character entry may be accomplished by any of the various switch closure methods commonly used in keyboard switches.

Movement of the key cap 12 is sensed by several sensors as a displacement of the lower portion 16 relative to the reference structure 14. The upper surfaces of the lower portion and the reference structure form a plane that is parallel to the lateral plane. Two sensors 26 and 28 sense the forward and backward movement of the key cap. One end of sensor 26 is affixed to the far side of the lower portion of the key cap, and the other end is affixed to the reference structure directly opposite. One end of sensor 28 is affixed to the near side of the lower portion, and the other end is affixed to the reference structure directly opposite. Sensors 26 and 28 are responsive to the magnitude of the gap between the lower portion and the reference structure. When the key cap is moved forward along direction 18, sensor 26 measures a smaller gap and sensor 28 measures a larger gap than before. When the key cap is moved backward along direction 20, sensor 26 measures a larger gap and sensor 28 measures a smaller gap than before. The displacement of the lower portion with respect to the reference structure, and thus the forward and backward movement of the key cap, is sensed by sensors 26 and 28. Sensors 26 and 28 generate analog signals that are proportional to the magnitude of the lateral force on the key cap along directions 18 and 20. These signals are conveyed to a signal conditioning circuit through wires 30 and 32.

Similarly, sensors 34 and 36 sense movement of the key cap to the right and left. One end of sensor 34 is affixed to the left side of the lower portion of the key cap, and the other end is affixed to the reference structure directly opposite. One end of sensor 36 is affixed to the right side of the lower portion, and the other end is affixed to the reference structure directly opposite. Sensors 34 and 36 are responsive to the magnitude of the gap between the lower portion and the reference structure. When the key cap is moved to the left along direction 22, sensor 34 measures a smaller gap and sensor 36 measures a larger gap than before. When the key cap is moved to the right along direction 24, sensor 34 measures a larger gap and sensor 36 measures a smaller gap than before. Sensors 34 and 36 generate analog signals that are proportional to the magnitude of the lateral force on the key cap along directions 22 and 24. These signals are conveyed to the signal conditioning circuit through wires 38 and 40.

Sensors 26, 28, 34, and 36 are preferably strain gauges in the illustrated first embodiment. Clearly, though, other sensors that are responsive to the movement of the key cap could be utilized. Other sensors that could be used include pressure sensors or other force sensitive devices adapted for sensing the movement or position of the key cap.

A second embodiment of a multipurpose keyswitch is illustrated in FIG. 2. This embodiment includes a key cap 50 and a reference structure 42 as did the first embodiment. In addition, a central support shaft 54 is provided to couple the key cap to the reference structure and character entry is achieved by vertically depressing key cap 50 along arrow 55. The lower end of shaft 54 is affixed to the reference structure, while the upper end is affixed to the underside of the key cap. Shaft 54 is flexible enough to permit movement of the key cap in the lateral plane defined by lateral directions 56, 58, 60, and 62. Movement of the key cap is detected by sensors 64 and 66, which are coupled to shaft 54. Sensors 64 and 66 are electrically connected to the signal conditioning circuit through wires 68 and 70. Sensors 64 and 66 are preferably strain gauges, and are responsive to bending of shaft 54. Sensor 64 is operable for detecting the bending of the shaft that results from the forward and backward movement of the key cap along directions 56 and 58. Similarly, sensor 66 is operable for detecting the bending of the shaft that results from movement of the key cap to the left and right along directions 60 and 62. The cross-section of shaft 54 is preferably square in shape, with its sides aligned with the lateral directions. Additional sensors may be placed on the shaft opposite sensors 64 and 66 to increase sensitivity.

Figure 3:
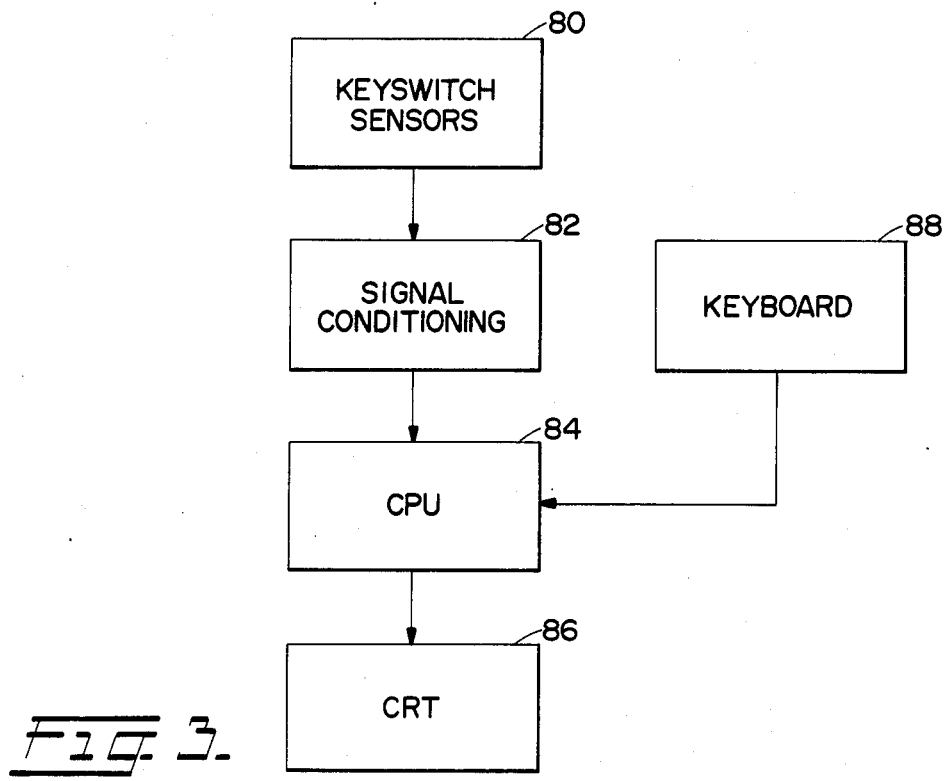
FIG. 3 is a block diagram of a control system for use with the multipurpose keyswitch of FIGS. 1 and 2.

A block diagram of the control system for use with the multipurpose keyswitch is illustrated in FIG. 3. Electrical signals from the keyswitch sensors 80 are indicative of the movement of the key cap. If strain gauges are used as the sensing elements, these electrical signals will be analog voltages having signal strengths that are proportional to the lateral force on the key cap. These signals are processed by a signal conditioning circuit 82 to convert them to a digital format, and are then input to a central processing unit 84. One of the functions of the central processing unit (CPU) is to control the display of CRT 86 according to a system program.

The CPU positions the cursor on the CRT according to the signals generated by the keyswitch sensors. Cursor positioning is accomplished by the CPU according to a system program executed by the CPU. Any of several different methods of moving the cursor can be utilized by the system program. For example, it may be desirable to move the cursor either horizontally or vertically, but not diagonally. If so, the system program can select the strongest signal from the keyswitch sensors and ignore other weaker signals. Another example of cursor movement may be to provide a variable speed cursor movement that depends upon the magnitude as well as the direction of the forces on the key cap. In a third example, diagonal movement of the cursor at forty-five degrees may be desirable in addition to horizontal and vertical movement. Diagonal movement of the cursor can be directed by the system program if one horizontal and one vertical signal are roughly equal in magnitude. By modification of the system program, several different methods of moving the cursor can be provided, all of which utilize the same sensor signals.

It may be desirable for the use of the cursor positioning capabilities of the multipurpose keyswitch to be activated by first closing an additional keyswitch on keyboard 88. If so, the system program in the CPU examines the output signals of the keyboard to determine whether the additional keyswitch has been closed, and if so, positions the cursor according to the signals generated by the keyswitch sensors.

Figure 4:
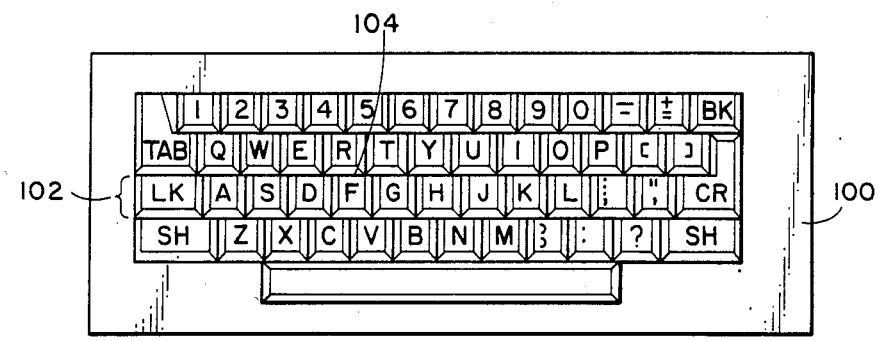
FIG. 4 is a plan top view of a keyboard that includes a multipurpose cursor control keyswitch according to the present invention.

Referring now to FIG. 4, there is shown an alpha-numeric keyboard 100 with the keys arranged in a standard "QWERT" configuration. In this configuration, the typist is taught to start with the fingers positioned on the keys of the home row 102 having the index finger of the left and right hands initially on the "F" and "J" keys, respectively. In the preceeding discussion, the "F" key was selected for incorporation of the multipurpose cursor control keyswitch according to the present invention. This is advantageous for several reasons. It is in the home row and it is positioned to be utilized by the left index finger. That is, it is located where one of the users fingers will be a large percentage of the time and beneath one of the users fingers for which one has the best small muscle control. Thus, the cursor can be moved rapidly without having to move ones hand and eyes to another portion of the keyboard and back again, which is time and major muscle usage intensive.

From the above description, it will be apparent that the invention disclosed herein provides a novel and advantageous apparatus for cursor positioning. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A keyboard system for operator entry of characters and control functions to a computer and computer display or the like, said keyboard system comprising:
   a plurality of, finger tip sized, alpha-numeric character keys organized in a preset pattern wherein:
      each key includes a vertically displaceable key cap having a corresponding alpha-numeric designation assigned thereto, and detection means coupled thereto for detecting vertical displacement of the key; and
      at least one of said plurality of alpha-numeric keys includes mounting means for permitting lateral motion in any direction, and for said at least one alpha-numeric key the corresponding detection means also detects lateral displacement thereof; and
   processor means coupled to the individual detection means of each of said plurality of alpha-numeric character keys for intitiating a signal corresponding to the alpha-numeric designation assigned to any key for which vertical displacement was detected, and for intitiating cursor control signals to position the cursor on the computer display in response to lateral displacement of such a key.

2. A keyboard system as in claim 1 wherein said plurality of alpha-numeric keys are laid out in a standard QWERTY typewriter keyboard pattern.

3. A keyboard system as in claim 1 wherein said at least one of said plurality of alpha-numeric keys is in one of the positions of the home row.

4. A keyboard system as in claim 2 wherein said at least one key is in the position to be actuated by the index finger of one hand of the operator.

5. A keyboard system as in claim 1 wherein:
   each key includes a reference structure that moves vertically during character entry; and
   the detection means of said at least one key includes at least two sensors coupled to the said key cap for sensing lateral movement of the key cap with respect to the reference structure to control the movement of said cursor in response thereto.

6. A keyboard system as in claim 5 wherein said key cap includes a lower portion that is pivotably coupled to said reference structure, and wherein said sensors are coupled between said key cap and said reference structure and sense the relative displacement therebetween.

7. A keyboard system as in claim 6 wherein the lower portion of said key cap includes a first surface coplanar with said lateral plane and said reference structure includes a second surface adjacent to and coplanar with said first surface, and wherein said sensors are coupled between said first and second surfaces.

8. A keyboard system as in claim 7 wherein said sensors are orthogonally positioned in a plane that is parallel to said lateral plane such that a first of said sensors indicates lateral movement of said key cap in a first lateral direction and a second of said sensors indicates lateral movement of said key cap in a second lateral direction, where said first and second lateral directions are orthogonal.

9. A keyboard system as in claim 8 wherein said sensors include four strain gauges with two of said strain gauges being positioned colinearly along said first lateral direction at opposite sides of said key cap, and with the other two of said strain gauges being positioned colinearly along said second lateral direction at opposite sides of said key cap.

10. A keyboard as in claim 5 wherein said key cap includes a central mounting shaft affixed at its lower end to said reference structure, and wherein said sensors are affixed to said shaft and are operable for sensing the bending thereof in response to lateral movement of said key cap.

11. A keyboard system as in claim 10 wherein said shaft is square in cross-section and has four sides, and wherein said sensors comprise four strain gauges with each of said strain gauges being coupled to said shaft along one of said four sides.

* * * * *